United States Patent
Wu et al.

(10) Patent No.: US 9,901,936 B2
(45) Date of Patent: Feb. 27, 2018

(54) PIPELINE TYPE OIL-WATER SEPARATOR AND CYCLONE GENERATOR FOR THE SAME

(75) Inventors: Yingxiang Wu, Beijing (CN); Jingyu Xu, Beijing (CN); Shiying Shi, Beijing (CN); Jun Guo, Beijing (CN); Jun Zhang, Beijing (CN)

(73) Assignee: INSTITUTE OF MECHANICS, CHINESE ACADEMY OF SCIENCES, Beijing (CN)

( * ) Notice: Subject to any disclaimer, the term of this patent is extended or adjusted under 35 U.S.C. 154(b) by 430 days.

(21) Appl. No.: 14/130,433

(22) PCT Filed: Feb. 22, 2012

(86) PCT No.: PCT/CN2012/071420
§ 371 (c)(1),
(2), (4) Date: Dec. 31, 2013

(87) PCT Pub. No.: WO2013/016952
PCT Pub. Date: Feb. 7, 2013

(65) Prior Publication Data
US 2014/0138306 A1 May 22, 2014

(30) Foreign Application Priority Data
Aug. 2, 2011 (CN) .......................... 2011 1 0220538

(51) Int. Cl.
*B04C 3/00* (2006.01)
*B01D 17/038* (2006.01)
(Continued)

(52) U.S. Cl.
CPC ............ *B04C 3/00* (2013.01); *B01D 17/0217* (2013.01); *B04C 3/06* (2013.01); *B04C 2003/006* (2013.01)

(58) Field of Classification Search
CPC ......... B01D 17/0217; B04C 3/00; B04C 3/06; B04C 2003/003; B04C 2003/006
See application file for complete search history.

(56) References Cited

U.S. PATENT DOCUMENTS 2,538,195 A * 1/1951 Erich ..................... B01D 45/08
55/450
2,906,705 A * 9/1959 Cross, Jr. .................. B01J 8/12
208/167
(Continued)

FOREIGN PATENT DOCUMENTS

| CN | 1078291 A | 11/1993 |
| CN | 1078292 A | 11/1993 |

(Continued)

OTHER PUBLICATIONS

English language machine translation of CN102251765A, Accessed Mar. 23, 2016, pp. 1-9.*

(Continued)

*Primary Examiner* — David C Mellon
(74) *Attorney, Agent, or Firm* — Gavrilovich, Dodd & Lindsey LLP

(57) ABSTRACT

The present invention discloses a cyclone generator for a pipeline type oil-water separator which separates oil from water using the principle of cyclone. The cyclone generator comprises: flow deflectors which are fixedly arranged along the circumferential direction of a pipe to generate, when an oil-water mixture flows through the flow deflectors, a centrosymmetric cyclone field to centrifugally separate oil from water. The present invention further discloses an oil-water separation device which uses the aforementioned principle, the mixture of oil and water flowing through the device forms a centrosymmetric cyclone field in which an oil core is distributed in the central area of a pipe without shifting (Continued)

significantly so as to achieve an excellent oil-water separation effect.

5 Claims, 3 Drawing Sheets

(51) Int. Cl.
   *B04C 3/06* (2006.01)
   *B01D 17/02* (2006.01)

(56) References Cited

U.S. PATENT DOCUMENTS

| | | | | |
|---|---|---|---|---|
| 3,885,935 A | * | 5/1975 | Nutter | B01D 45/12 55/424 |
| 4,654,061 A | * | 3/1987 | Jung | B01D 45/16 55/447 |
| 5,510,017 A | * | 4/1996 | Abdullayev | B04C 3/06 210/512.1 |
| 6,666,338 B1 | * | 12/2003 | Henriksson | B04C 3/00 209/208 |
| 7,279,020 B2 | * | 10/2007 | Christiansen | B04C 3/06 55/338 |
| 2011/0078987 A1 | | 4/2011 | Shishov et al. | |

FOREIGN PATENT DOCUMENTS

| | | |
|---|---|---|
| CN | 2508863 Y | 9/2002 |
| CN | 2601121 Y | 1/2004 |
| CN | 102251765 A | 11/2011 |
| CN | 102251766 A | 11/2011 |
| EP | 0785029 A1 | 7/1997 |
| GB | 2354466 A * | 9/1999 |

OTHER PUBLICATIONS

He, Huangqing, International Search Report, State Intellectual Property Office of the P.R. China, PCT/CN2012/071420, dated May 31, 2012.

* cited by examiner

PIPELINE TYPE OIL-WATER SEPARATOR AND CYCLONE GENERATOR FOR THE SAME

CROSS REFERENCE TO RELATED APPLICATIONS

This application is a National Stage Application filed under 35 U.S.C. § 371 and claims priority to International Application Serial No. PCT/CN2012/071420, filed Feb. 22, 2012, which application claims priority to Chinese Application No. 201110220538.X, filed Aug. 2, 2011, the disclosures of which are incorporated herein by reference.

FIELD

The present invention relates to an oil-water separator and a cyclone generator for the same and more particularly to an oil-water separator used in a downhole oil-water separation system and a cyclone generator for the same.

BACKGROUND

With the continuous development of oil fields, most of domestic oil fields have entered an intermediate or high water-cut development stage, and the liquid extracted from oil fields generally contains more than 90% of water. The continuous increase in water content leads to a rise in the expense of lifting the liquid extracted, making production cost get higher and higher; when the extraction of the mixture liquid costs more than the profits brought by the oil separated from the mixture liquid, oil wells will be on the verge of their economic exploitation limits and therefore forced to shut down. Thus, the use of an oil-water pre-separation device in oil wells is of great significance to the improvement of the recovery rate of oil wells.

In order to meet the demand for oil, domestic oil exploration will mainly rely on the development of offshore oil, inevitably extending to deep water, extremely deep water; the major technical bottleneck which restricts the oil exploration in a deep water region lies in an efficient oil-water separation technology for the use in a deep water environment. The high-pressure environment of deep-water disables a bulky tank separator and requires the use of a compact tubular separator.

The separation principle of existing oil-water pre-separation equipment mainly lies in gravity and centrifugation, for example, an oil-water separator based on the principle of gravity is disclosed in the prior Patent Application No. CN1078291A, however, in practical production, it is usually needed to separate a great amount of oil-water mixture quickly, while the principle of gravity, although being an effective separation means, is relatively slow in processing speed. In the prior Patent Application No. CN1078292A, there is disclosed a downhole oil-water separator which accelerates the separation of oil from water by generating a cyclone field with dynamic blades, and in the authenticated Utility Model No. CN2601121Y, there is disclosed an oil-water pre-separation device for extracted liquid which separates oil from water with the cyclone generated through the corotation of a separating impeller and a working barrel. The aforementioned separation devices, both of which realize oil-water separation based on the principle of centrifugation, are commonly equipped with a moving component and are therefore difficult to be maintained.

SUMMARY

To overcome the shortages of the aforementioned oil-water separators in size, separation speed and device maintenance and meet the future demand for downhole oil-water separation, the present invention aims to provide a compact and high separation efficiency oil-water cyclone separator free of moving components which is based on the principle of centrifugal separation and has an axial entrance and a cyclone generator for the separator.

In accordance with an aspect of the present invention, a cyclone generator for a pipeline type oil-water separator comprises flow deflectors which are fixedly arranged along the peripheral direction of a pipe to generate, when the mixture of oil and water flows through the flow deflectors, a centrosymmetric cyclone field with the matched pipe to centrifugally separate oil from water.

The flow deflectors, the number of which may be more than 2, may be fixedly and uniformly distributed along the peripheral direction of the pipe in an inclined and in-phase manner and sequentially overlapped in the axial direction of the pipe.

The included angle θ between the long axes of the flow deflectors and the cross section of the pipe is equal to and greater than 10 degrees but equal to and smaller than 60 degrees.

Optimally, the included angle θ between the long axes of the flow deflectors and the cross section of the pipe is 45 degrees.

The included angle α between the short axes of the flow deflectors and the cross section of the pipe is equal to and greater than 0 degree but equal to and smaller than 45 degrees.

Optimally, the included angle α between the short axes of the flow deflectors and the cross section of the pipe is 0 degree.

The number of the flow deflectors may be 2-6.

The thickness h of the flow deflectors may be 2 mm-7 mm.

In accordance with another aspect of the present invention, there is provided a pipeline type oil-water separator comprising a cyclone generation pipe section which comprises a cyclone pipe and a cyclone generator device which is fixed arranged inside the cyclone pipe.

The pipeline type oil-water separator further comprises a liquid inlet pipe section and a water removing pipe section, wherein the liquid inlet pipe section, the cyclone generation pipe section and the water removing pipe section are sequentially connected, the inner diameter of the cyclone pipe of the cyclone generation pipe section is greater than that of the liquid inlet pipe of the liquid inlet pipe section, and a diffuser pipe section is also arranged between the liquid inlet pipe section and the cyclone generation pipe section to connect the liquid inlet pipe with the cyclone pipe.

The water removing pipe section comprises a converging water removing pipe segment which comprises a water removing pipe the diameter of which is gradually reduced along the direction of the main flow of the oil-water mixture and which is provided with an oil-water inlet and an outlet, wherein more than one group of water removing holes are axially arranged on the water removing pipe, the external circumferential surfaces of the water removing holes are tangent to the inner wall of the water removing pipe, and the diameter d' of the water removing holes meets the following formula: d'≤bD−cαD, where b and c are constants, d is the diameter at the outlet, and a is the oil content at the inlet.

The constant b may be 0.25 and the constant c may be 0.8925.

The number of each group of water removing holes which may be uniformly distributed along the peripheral direction of the water removing pipe may be equal to that of the flow deflectors.

The cyclone pipe of the cyclone generation pipe section may be 1.2 to 1.5 times the inner diameter of the liquid inlet pipe of the liquid inlet pipe section.

A chamber, which comprises a barrel for accommodating the liquid discharged from the water removing holes and an outlet pipe section connecting with the barrel, is also formed outside the water removing pipe.

A first flowmeter is arranged in the liquid inlet pipe section, and a second flowmeter and a ball valve which may be regulated to control the flow of the second flowmeter are arranged in the outlet pipe section, and the amount of the water separated are controlled according to values of the first and second flowmeters.

The inner diameters of the liquid inlet pipe in the liquid inlet pipe section and the pipe in the water outlet pipe section are the same.

The present invention has the following advantages:

1. the present invention is an oil-water separator which uses the principle of cyclone and in which a liquid inlet pipe section and a water outlet pipe section have the same inner diameter, thus, the separator can be installed merely by cutting off one section of a liquid extraction pipe needing processing and replacing the section cut off with the separator, without changing the direction of the pipe flow; thus, the separator is superior in adaptability and is obviously improved in processing efficiency when compared with the conventional gravity settlement separator device, additionally, the separator occupies little space.

2. a centrosymmetric cyclone field is generated when oil and water entering the cyclone generation pipe section in a certain ratio contact with the flow deflectors, for example, in the structure provided with a plurality of flow deflectors embodied in an embodiment of the present invention, the circumferential inclination of the flow deflectors towards the same direction makes the liquid guided along each flow deflector in an annular direction substantially flow in the same way, thereby achieving a uniform vortex effect to guarantee the central symmetry of the cyclone filed generated after the liquid passes through the flow deflectors. As the oil-water mixture guided by the flow deflectors flows towards the same direction in the pipe nearly without being interrupted by any external flow field, the symmetrical flow field generated is relatively stable. In the symmetrical stable cyclone flow field, oil, which is smaller in density than water, moves towards the center of a pipe under the effect of a centripetal buoyancy which is greater than a centrifugal force while water moves towards an opposite direction, that is, water moves to the position nearby the wall of the pipe, and an oil core is stably distributed in the central area of the circular pipe, not shifting significantly, thus, an excellent oil-water separation effect is achieved.

3. the configuration of the static flow deflectors avoids a sealing operation which is required to be carried out for dynamic flow deflectors in a downhole high-pressure environment, moreover, the cyclone generation mode adopted herein overcomes the interference caused by the flow guidance of a tangential inlet on a generated cyclone field, making the cyclone field more symmetrically stable, besides, this mode eliminates the problem that tangentially guided oil and water flow towards opposite directions and therefore avoids the re-mixing of oil and water caused by the movement of oil and water in opposite directions and further improves separation efficiency.

4. the cyclone generation pipe section described herein is installed in a pipe, but not added with another pipe to be changed to a two-dimensional structure like a tangential inlet, thus, the separator disclosed herein is space-saving and is therefore capable of using downhole space more effectively to be improved in processing capacity, as a result, the separator is more suitable for a downhole oil-water separation system; on the other hand, in a deep-water high-pressure environment, a tangential inlet makes the tangent part become a weak link where additional welding strength is required, whereas flow deflectors axially installed on the inner wall of a pipe are free from the problem, thus, the present invention has a bright industrial application prospect.

5. the external circumferential surface of the water removing hole arranged in the water removing apparatus is tangent to the inner wall of the water removing pipe, and the diameter d' of the water removing hole is set to be: $d' \leq bD - c\alpha D$, thus, water removing holes different in diameter can be adjusted according to an oil content to improve oil-water separation efficiency.

DETAILED DESCRIPTION

As discussed below with reference to accompanying drawings, in accordance with an aspect of the present invention, there is provided a cyclone generator for a pipeline type oil-water separation device (oil-water separator) which makes the mixture of oil and water flowing therethrough generate a centrosymmetric cyclone field using the principle of cyclone to realize the separation of oil from water. In the present invention, the cyclone generator comprise flow deflectors which may be fixed arranged in a pipe so that a centrosymmetric cyclone field is generated when the oil-water mixture flows through the flow deflectors to realize the separation of oil from water. It can be known from this that the use of the flow deflectors is to make the oil-water mixture flowing therethrough generate a centrosymmetric cyclone field, thus, the flow deflectors may take any shape that is capable of making the oil-water mixture flowing therethrough generate a centrosymmetric cyclone field, for example, the flow deflectors may be overlapped with each other like described in the following embodiments. Apparently, the flow deflectors may be in any form, for example, an integrated blade shape, that is capable of achieving the aforementioned purpose.

Here, on the basis of an example of a plurality of overlapped flow deflectors, the detailed structure of the flow deflectors and how the overlapped flow deflectors achieve the aforementioned function are described below.

Figure 2:
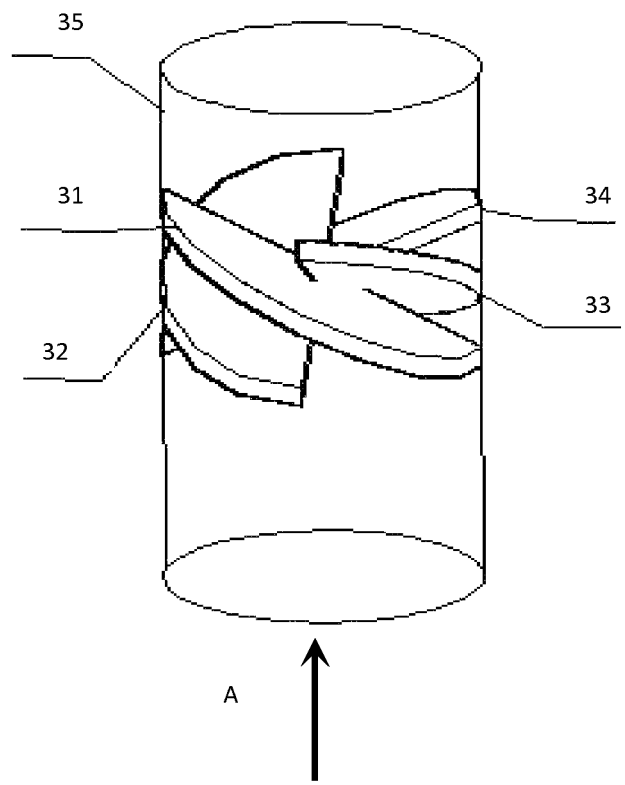
FIG. 2 is a schematic diagram illustrating the structure of the cyclone generation pipe section shown in FIG. 1.

As shown in FIG. 2, the cyclone generator disclosed herein comprises four flow deflectors 31, 32, 33 and 34 which may be fixedly arranged (preferably in an inclined and in-phase manner) in a pipe 35, the flow deflectors 31, 32, 33 and 34 are arranged (preferably, arranged uniformly) along the circumferential direction of the pipe 35 and sequentially overlapped along the axial direction of the pipe 35. When the oil-water mixture flows through the flow deflectors 31, 32, 33 and 34 along a flow direction A, a centrosymmetric cyclone field is generated in which oil and water which are different in density are separated by different centrifugal forces.

Figure 3:
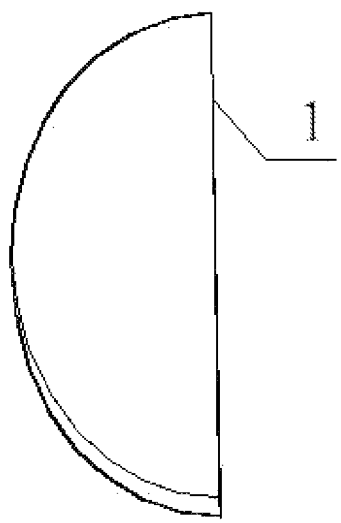
FIG. 3 is a schematic diagram illustrating the structure of the flow deflector shown in FIG. 2.

As shown in FIG. 3, the flow deflectors 31, 32, 33 and 34 are made from semi-elliptic stainless steel or another wear-resistant material and, certainly, take any shape that is capable of enabling the flow deflectors to achieve the aforementioned function, the included angle θ between the long axes of the flow deflectors 31, 32, 33 and 34 and the cross section of the pipe 35 is 45 degrees, and the short axes of the flow deflectors 31, 32, 33 and 34 are parallel to the cross section of the pipe 35, that is, the included angle α between the short axes of the flow deflectors 31, 32, 33 and 34 and the cross section of the pipe 35 is 0 degree.

In the conventional generation of a cyclone field involving a tangential inlet, oil moves towards the center of the cyclone field to generate an oil core which flows opposite to water in a different area to realize the separation of oil from water, however, in the case where the cyclone field is unstable, part of the oil in the oil core may be taken away by the water flowing in the opposite direction, making the separation of oil from water more difficult. As a contrast, according to the generation of a cyclone field disclosed herein, after the mixture of oil and water is guided by axially arranged static flow deflectors 31, 32, 33 and 34, a cyclone field is generated in which the oil core generated by oil moves in the same direction with the water distributed nearby the wall of the pipe, thus reducing the aforementioned risk.

A uniform vortex effect is achieved as the part of the oil-water mixture guided by each flow deflector in an annular direction substantially flows in the same way when oil and water entering the cyclone generator in a given ratio contact with the flow deflectors 31, 32, 33 and 34 which are inclined towards the same direction, thus guaranteeing the central symmetry of the generated cyclone field after the oil-water mixture passes through the flow deflectors. In addition, as the oil-water mixture guided by the flow deflectors 31, 32, 33 and 34 moves towards the same direction in the pipe 35 nearly without being interfered by any external flow field, the generated symmetric flow field is relatively stable, and oil, which is smaller in density than water, moves towards the center of the pipe under a centripetal buoyancy greater than a centrifugal force while water moves towards an opposite direction, that is, moves to be nearby the wall of the pipe, an oil core is stably distributed in the central area of the circular pipe 35 in the symmetrical stable flow field without shifting significantly, thus achieving an excellent oil-water separation effect.

In the symmetrical stable flow field, oil, which is smaller in density than water, moves towards the center of the pipe under a centripetal buoyancy greater than a centrifugal force while water moves towards an opposite direction, that is, moves to be nearby the wall of the pipe. In the symmetrical stable flow field, an oil core is stably distributed in the central area of the circular pipe without shifting significantly; meanwhile, the axially arranged flow deflectors shorten the radial movement distance of oil drops to accelerate the movement of the oil drops to the axes.

In embodiments described herein, the flow deflectors 31, 32, 33 and 34 are arranged in the pipe 35 with the long axes thereof forming an included angle θ of 45 degrees with the cross section of the pipe 35, certainly, the θ may be equal to or greater than 10 degrees but equal to or smaller than 60 degrees. The short axes are parallel to the cross section of the pipe 35, that is, the included angle α between the short axes and the cross section of the pipe 35 is 0 degree, certainly, the α may be equal to or greater than 0 degree but equal to or smaller than 45 degrees. The thickness h of the flow deflectors 31, 32, 33 and 34 is generally set to be 2 mm-7 mm to guarantee a sufficient strength, for example, the thickness of the flow deflectors may be 2 mm when the diameter d of the pipe 35 is 75 mm.

In embodiments described herein, the setting of 2-6 flow deflectors may also achieve the same or similar oil-water separation effect. The flow deflectors are sequentially overlapped in the central area of the circular pipe 35 in such a manner that central overlapping points are tightly close to each other, thereby guaranteeing the flowing of the oil-water mixture through each flow deflector.

Figure 1:
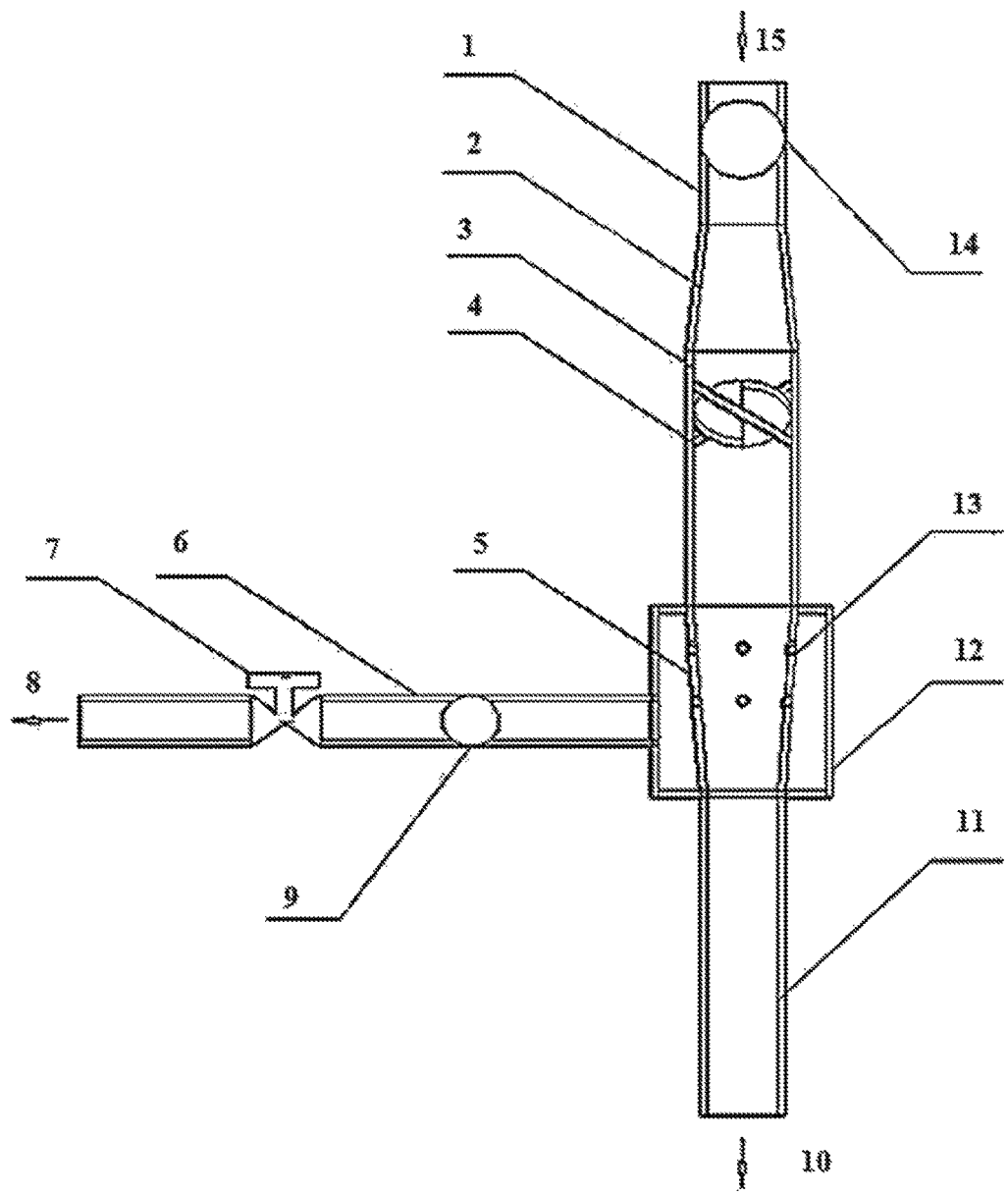
FIG. 1 is a schematic diagram illustrating the structure of the present invention.

In accordance with another aspect of the present invention, there is provided an oil-water separation device (oil-water separator) equipped with the aforementioned cyclone generator. As shown in FIG. 1, the oil-water separation device (oil-water separator) comprises a liquid inlet pipe section 1, a diffuser pipe section 2, a cyclone generation pipe section 3 and a converging water removing pipe section 5 which are sequentially connected with each other, wherein the diffuser pipe section 2 is arranged between the liquid inlet pipe section 1 and the cyclone generation pipe section 3 as the inner diameter of the cyclone pipe in the cyclone generation pipe section 3 is greater than that of the pipe of the liquid inlet pipe section 1, and a flowmeter 14 is arranged on the liquid inlet pipe of the liquid inlet pipe section 1. A cyclone generator is installed at the position of the pipe 35 (cyclone pipe) of the cyclone generation pipe section 3.

Figure 4:
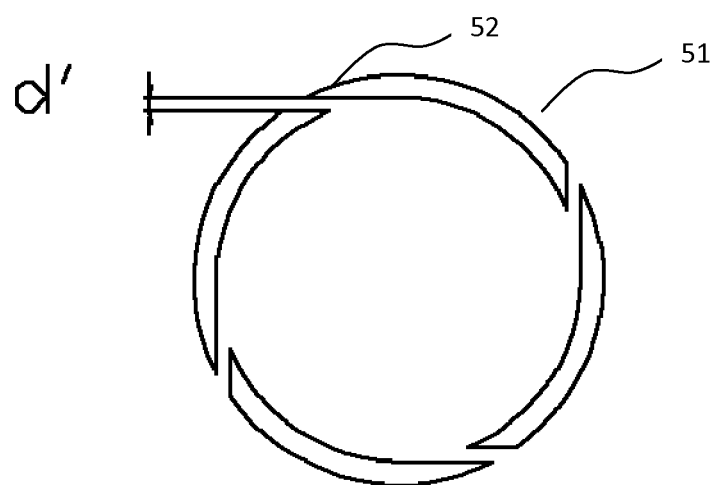
FIG. 4 is a schematic diagram illustrating the structure of the water removing hole shown in FIG. 1.

The converging water removing pipe section 5 comprises a water removing pipe 51 the diameter of which is gradually reduced along the main flow direction of the oil-water mixture and more than one group of water removing holes 52 which are arranged on the water removing pipe 51 at proper intervals along the main flow direction of the oil-water mixture, and the number of each group of water removing holes 52 which may be uniformly distributed along the circumferential direction of the water removing pipe 51 is the same as that of the flow deflectors 31, 32, 33 and 34. The external circumferential surface of the water removing hole 52 is tangent to the inner wall of the water removing pipe 51, as shown in FIG. 4; and the diameter d' of the water removing hole 52 meets the following formula: $d' \leq bD - c\alpha D$, where b and c are constants, D is the diameter at the outlet, and a is the oil content at the inlet. In embodiments described herein, b is 0.25, D is 0.05 and c is 0.8925. Setting the water removing holes 52 like this greatly reduces the possibility that oil flows out of the water removing pipe, reduces the loss of pressure drop and consequentially improves separation efficiency.

A chamber is formed outside the water removing pipe 51 with the water removing pipe section 5, the chamber comprising a barrel 4 for accommodating the liquid discharged from the water removing holes 52 and a water outlet pipe section 6 which is connected with the barrel 4 and from which water is discharged; a ball valve 7 and a flowmeter 9 are arranged on the water outlet pipe section 6; and the ball valve 7 is regulated to control the percent of the flow flowing out from an outlet 8 in the flow in the liquid inlet pipe section 1. The rest oil-water mixture is discharged from an outlet 10 arranged at the downstream of the main flow without changing the flowing direction of the main flow, the outlet 10, that is, the outlet arranged on a pipe 11 at the output end of the water-discharging pipe 51, is a rich oil outlet.

In the embodiments described above, the inner diameter of the diffuser pipe section 2 is depended on those of the liquid inlet pipe and the cyclone pipe 35 in the cyclone generation pipe section 3, and the cyclone pipe 35 is 1.2-1.5 times the inner diameter of the liquid inlet pipe so that a relatively large space is provided for the converging water removing pipe section 5 which is arranged to remove water later. The water outlet pipe section 6 is vertically connected with the barrel 12 with central lines thereof orthogonal to each other. The flowmeter 9 and the ball valve 7 are arranged on the water outlet pipe section 6 to form the water outlet 8.

Specific application examples are illustrated below.

The liquid extracted from an oil well containing 5-20% of oil flows into the liquid inlet pipe section 1 through the flowmeter 14 along the flowing direction A of the liquid at a rate of flow of 15 m$^3$/h, the flowmeter 14 at the inlet recording the rate of flow at the inlet.

Under the guidance flow of the diffuser pipe section 2, the oil-water mixture smoothly flows into the cyclone generation pipe section 3 and is then guided here by the flow deflectors 31, 32, 33 and 34 to form a fluid rotating at a high speed, and oil and water phases are quickly separated from each other under the effect of a centrifugal force, water greater in density gathering on the inner wall of the pipe while oil smaller in density gathering in the central area of the pipe.

Under the action of inertia, the separated oil and water enter the converging water removing pipe section 5 in which centrifugal effect is enhanced so that oil gathers in the central area of the pipe and water located nearby the inner wall of the water removing pipe 51 flows out through the water removing holes 52 on the wall of the pipe to achieve the separation of oil from water; the values of the flowmeters 9 and 14 are monitored by regulating the ball valve 7 on the water outlet pipe section 6 so as to control the value of the flowmeter 9 to be approximate to 50% of the value of the flowmeter 14 to remove about 50% of water. The diameter d' of the water removing holes 52 is 2 mm in this embodiment. With the converging water removing pipe section 5, the rest 50% oil-water mixture is conveyed to a platform or the mouth of the well to separate oil and water finely.

The oil content of the re-injection water processed by the separator is below 1000 ppm, meeting the national standard for the processing of a downhole or undersea water processing system.

The embodiments described above are merely preferred embodiments of the present invention which are not presented to limit the present invention in any form. Any simple modification, improvement and equivalent that is devised without departing from the spirit and scope of the present invention falls into the scope of the present invention.

INDUSTRIAL APPLICABILITY

The cyclone generator and corresponding oil-water separation device provided herein makes the oil-water mixture flowing through the cyclone generator form a centrosymmetric cyclone field using the principle of cyclone to achieve the separation of oil from water, moreover, the formed relatively stable symmetric cyclone field has an excellent oil-water separation effect. In addition, as the liquid inlet pipe section and the water outlet pipe section of the oil-water separator provided herein have the same inner diameter, the separator can be installed merely by cutting off one section of a liquid extraction pipe needing processing and replacing the section cut off with the separator, without changing the direction of the pipe flow; thus, the separator is superior in adaptability and is obviously improved in processing efficiency when compared with the conventional gravity settlement separator device, additionally, the separator occupies little space.

What is claimed is:

1. A pipeline type oil-water separator, comprising a cyclone generation pipe section which comprises a cyclone pipe and a cyclone generator device which is fixedly arranged in the cyclone pipe, wherein the cyclone generator device comprises:

flow deflectors which are fixedly arranged along a circumferential direction of the cyclone pipe to generate, when an oil-water mixture liquid flows through the flow deflectors, a centrosymmetric cyclone field to centrifugally separate oil from water, wherein the flow deflectors, a number of which is more than 2, are uniformly distributed along the circumferential direction of the cyclone pipe in an inclined manner and sequentially overlapped in an axial direction of the cyclone pipe, wherein the flow deflectors are sequentially overlapped in a central area of the cyclone pipe in such a manner that the sequentially overlapped deflectors intersect and directly contact each other at one intersection point through which a central axis in the axial direction of the cyclone pipe passes, a liquid inlet pipe section and a water removing pipe section, wherein the liquid inlet pipe section, the cyclone generation pipe section and the water removing pipe section are sequentially connected, an inner diameter of the cyclone pipe in the cyclone generation pipe section is greater than that of a liquid inlet pipe of the liquid inlet pipe section, and a diffuser pipe section arranged between the liquid inlet pipe section and the cyclone generation pipe section to connect the liquid inlet pipe with the cyclone pipe, wherein the water removing pipe section comprises a converging water removing pipe section, the converging water removing pipe section comprising a water removing pipe which is gradually reduced in diameter along a direction of a main flow of the oil-water mixture, the water removing pipe being provided with an oil-water inlet and an outlet; more than one group of water removing holes are arranged on the water removing pipe along an axial direction of the water removing pipe, external circumferential surfaces of the water removing holes are tangent to an inner wall of the water removing pipe, and a diameter d' of the water removing holes meets the following formula: d'≤bD−cαD where b and c are constants, D is a diameter at the outlet, and α is an oil content at the oil-water inlet, wherein b is 0.25 and c is 0.8925.

2. The pipeline type oil-water separator according to claim 1, wherein an included angle θ between a long axes of the flow deflectors and a cross section of the pipe is equal to or greater than 10 degrees but equal to or smaller than 60 degrees, wherein the long axes are axes in a length direction of the flow deflectors.

3. The pipeline type oil-water separator according to claim 1, wherein an included angle α between a short axes of the flow deflectors and a cross section of the pipe is equal to or greater than 0 degree but equal to or smaller than 45 degrees, wherein the short axes are axes in a width direction of the flow deflectors.

4. The pipeline type oil-water separator according to claim 1, wherein the inner diameter of the cyclone pipe of the cyclone generation pipe section is 1.2-1.5 times as much as that of the liquid inlet pipe of the liquid inlet pipe section.

5. The pipeline type oil-water separator according to claim 1, wherein a chamber, which comprises a barrel for accommodating liquid discharged from the water removing holes and an outlet pipe section connecting with the barrel, is also formed outside the water removing pipe.

* * * * *